No. 735,764. PATENTED AUG. 11, 1903.
M. H. HART.
APPARATUS FOR MAKING GLASSWARE.
APPLICATION FILED JUNE 30, 1899.
NO MODEL. 3 SHEETS—SHEET 2.
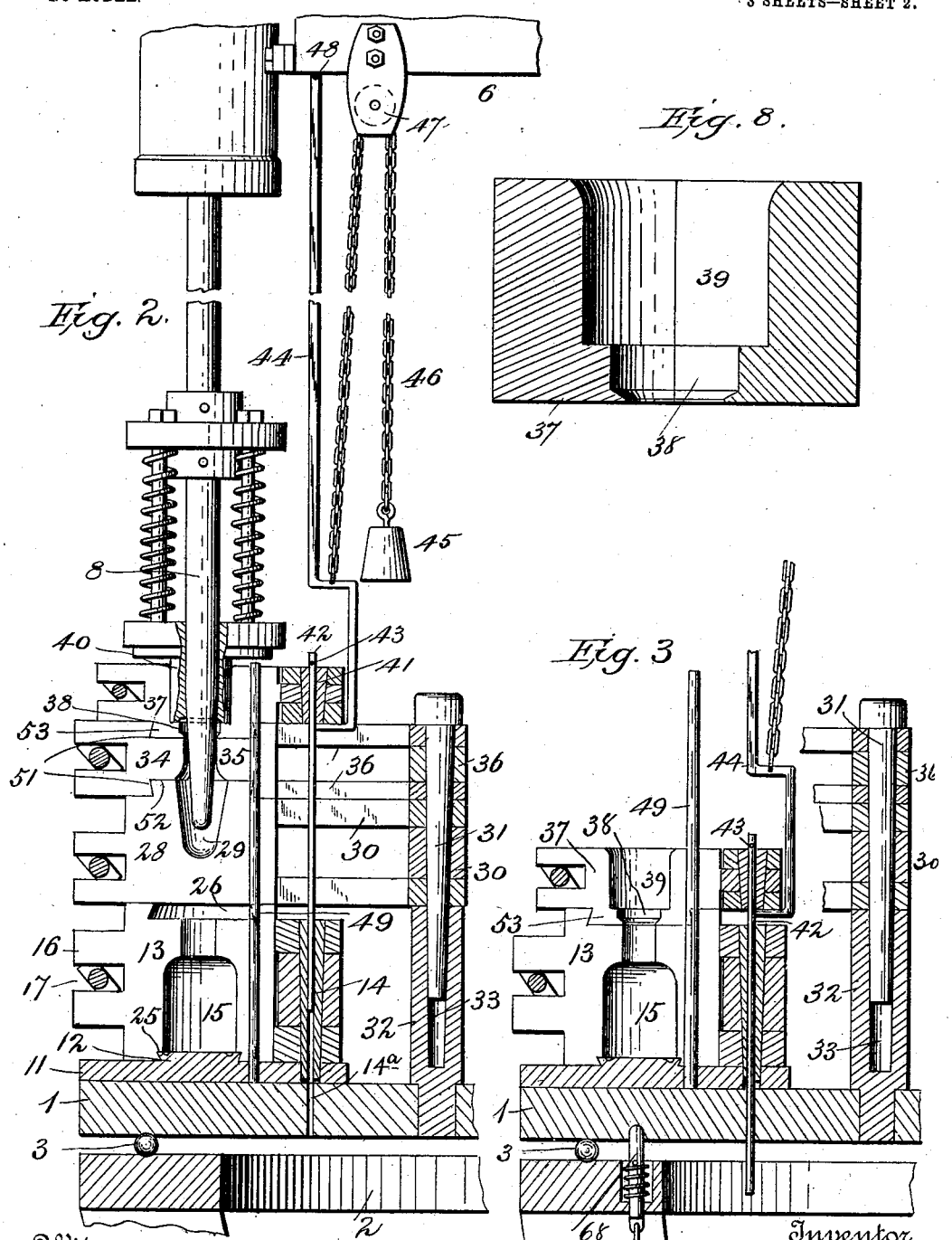
Witnesses
Franck L. Ourand
B. E. Bowie
Inventor
Matthew H. Hart
By C. J. Stockman
Attorney

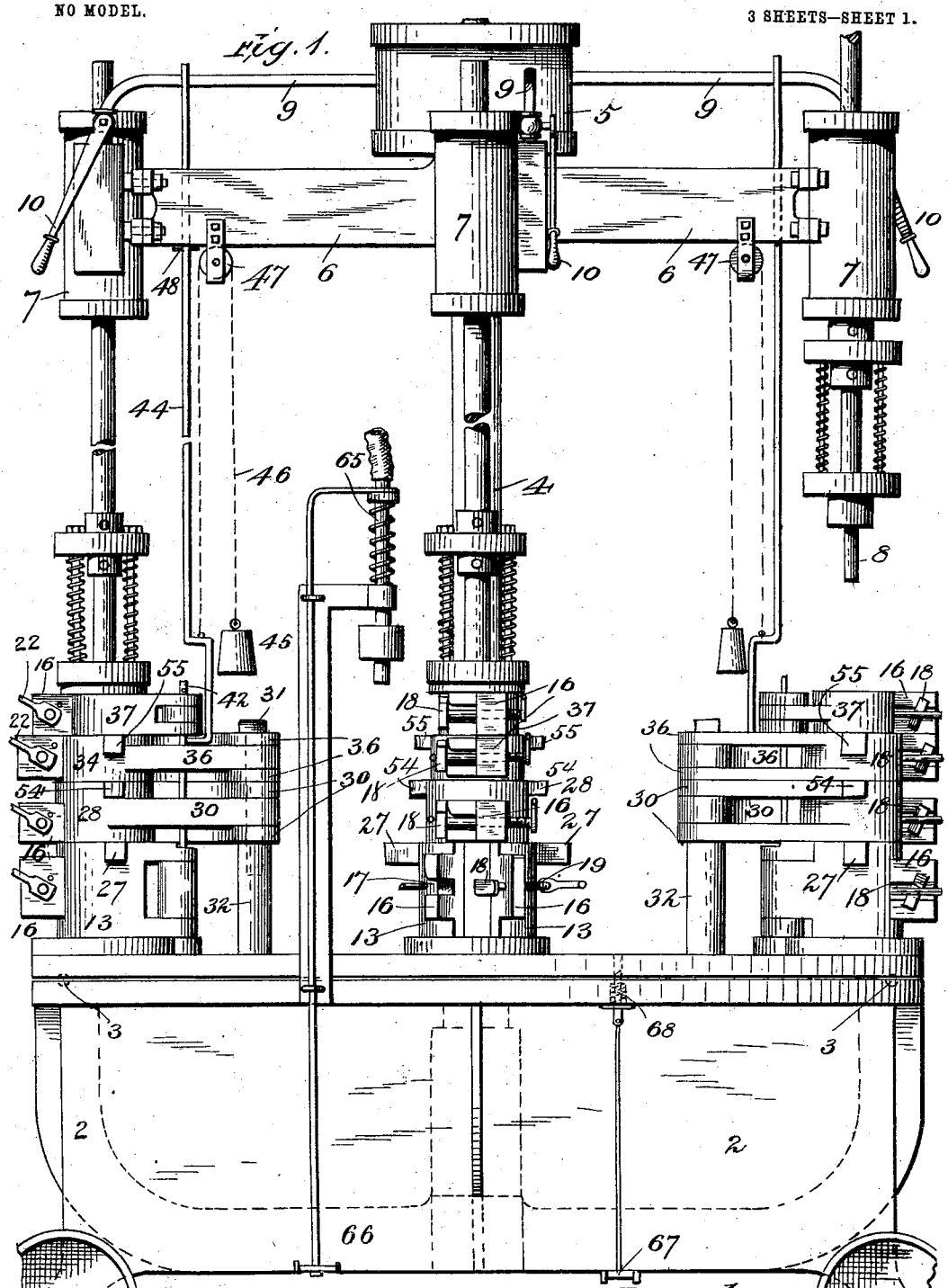

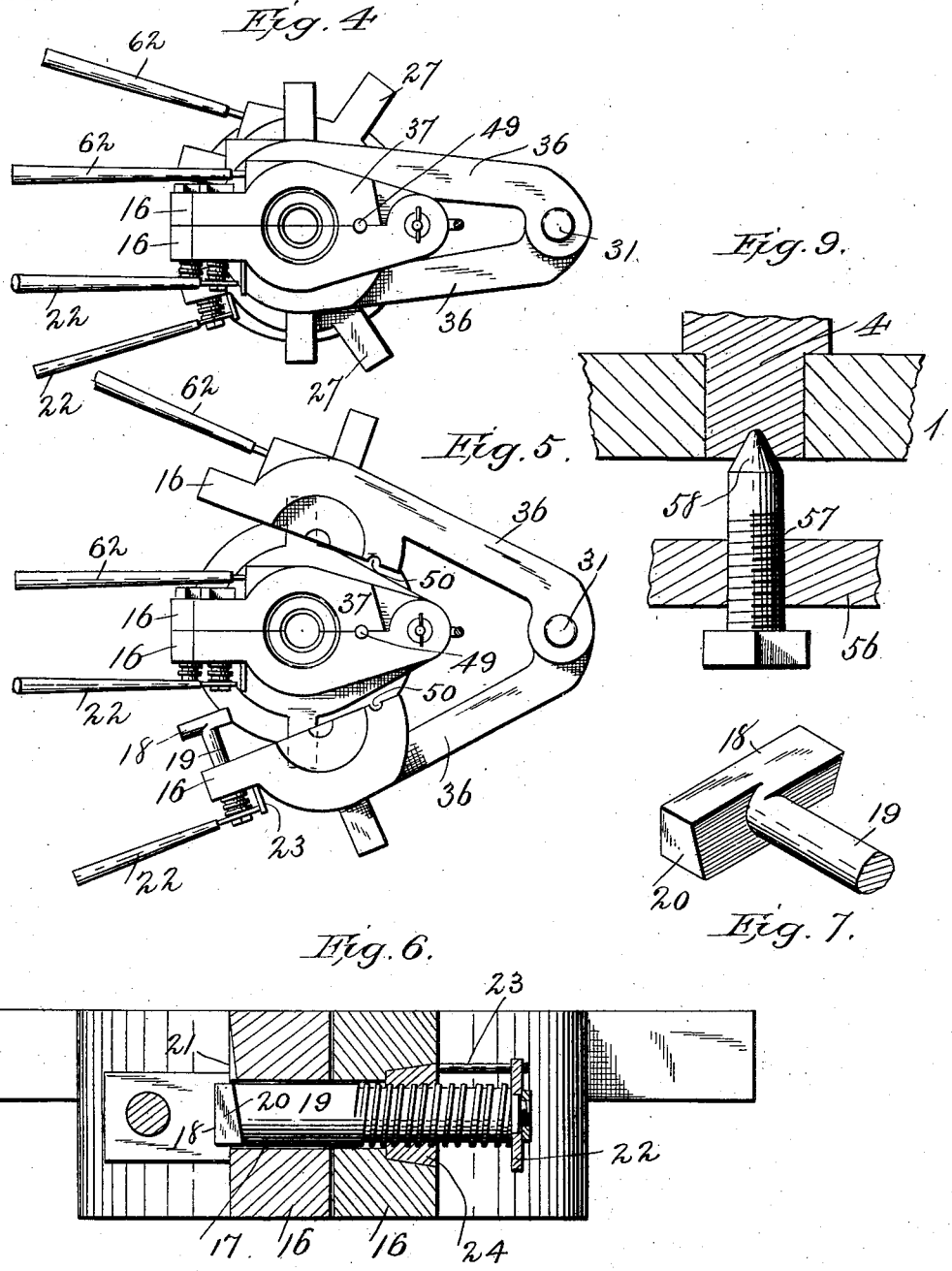

No. 735,764. Patented August 11, 1903.

UNITED STATES PATENT OFFICE.

MATTHEW H. HART, OF DUNKIRK, INDIANA, ASSIGNOR OF THREE-FOURTHS TO CHARLES F. BIRCH, SR., AND EDWARD S. HART, OF DUNKIRK, INDIANA, AND THOMAS F. HART, OF MUNCIE, INDIANA.

APPARATUS FOR MAKING GLASSWARE.

SPECIFICATION forming part of Letters Patent No. 735,764, dated August 11, 1903.

Application filed June 30, 1899. Serial No. 722,362. (No model.)

*To all whom it may concern:*

Be it known that I, MATTHEW H. HART, a citizen of the United States, residing at Dunkirk, in the county of Jay and State of Indiana, have invented certain new and useful Improvements in Apparatus for Making Glassware; and I do declare the following to be a full, clear, and exact description of the invention, such as will enable others skilled in the art to which it appertains to make and use the same, reference being had to the accompanying drawings, and to the figures of reference thereon, which form a part of this specification.

This invention relates to apparatus for pressing and blowing articles of glassware—such as bottles of various description, fruit-jars, lantern-globes, lamp-chimneys, &c.—and its object is to provide an apparatus in which the article will first be partially formed in a press-mold and then while supported by the press-mold or a portion thereof be lowered vertically into another mold, where it will be completely formed by blowing.

The apparatus illustrated in the accompanying drawings is designed especially for the manufacture of bottles with long and narrow necks; but it must be distinctly understood that my invention is not restricted in its use to the manufacture of such shaped bottles.

In the accompanying drawings, Figure 1 is a side elevation of the apparatus. Fig. 2 is a vertical section through the molds, showing in elevation the plunger and part of its actuating-cylinder. Fig. 3 is a sectional view, partly broken away, showing the molds in position for the blowing operation. Fig. 4 is a plan view of the molds in position for the pressing operation. Fig. 5 is a similar view of the molds in position for the blowing operation. Fig. 6 is a front view, partly in section, of a lock for the molds. Fig. 7 is a detail of the lock. Fig. 8 is a sectional view, enlarged, of what will be termed hereinafter the "finish-mold." Fig. 9 is a sectional detail of a step-support for the central vertical standard.

Similar reference-numerals indicate similar parts in the several views.

The operating mechanism is preferably supported on a table 1, which in turn is supported on a wheeled truck 2. The table is revoluble on the truck, and a series of balls 3 is interposed between them in the usual manner. A vertical standard 4 is secured at its lower end in the table and carries at its upper end a compressed-air reservoir 5. This reservoir will be kept charged with compressed air by any suitable means, (not necessary to be shown.) A series of radiating arms 6 are also carried by the standard 4 near its upper end, and each arm carries a cylinder 7, the piston of which actuates a plunger 8. Each cylinder is connected to the reservoir 5 by means of a pipe 9, and any suitable valve mechanism may be employed to control admission of air to the cylinder. The valve-operating lever is indicated by 10. All of this mechanism will turn with the table. In the drawings the apparatus is arranged to carry four cylinders, but any number more or less may be employed, as found desirable.

The molds in which the article is formed will be termed the "press-mold" and the "blow-mold," and they are superposed, the blow-mold being below the press-mold. In the press-mold the upper part of the article is first formed, while the main body portion is subsequently formed in the blow-mold.

It will be observed that in lieu of having a single plunger, into operative relationship with which the molds are successively brought by the rotation of the table, there is a separate plunger for each mold, and the molds and plungers are carried by and rotated with the table. This overcomes the heating of the plunger, which causes it to stick to the glass, which has been a source of considerable trouble in the presses having a single plunger and a plurality of molds.

Referring now particularly to Figs. 2, 3, 4, 5, 6, and 7 of the drawings, the bottom plate 11 of the blow-mold is secured to the table in any suitable manner and is provided with a raised seat 12, which forms the bottom of the mold-cavity. As shown in the drawings, the blow-mold is divided vertically to form two substantially equal parts 13 13, which are hinged at their rear ends on a tapered sleeve 14, supported in an opening in the bottom plate 11. Each part is provided with a cavity 15, which may be of any desired shape according to the article to be made. The one shown in the drawings is shaped to form a bottle with a long and narrow neck. Each part is also provided with a forwardly-extending locking-plate 16, one of which is slotted, as indicated at 17. Some means must be provided to lock the two parts of the mold in their closed position and such means must be quick acting. Experiment has demonstrated that the locking means illustrated is very efficient for the purpose; but I do not claim such locking means as my invention. I will, however, briefly describe it. In the unslotted plate 17 an opening is provided for the passage of a rod 19, which is screw-threaded for a portion of its length. The opening in the plate may also be screw-threaded; but preferably a nut 24, of hardened steel, is fitted in the plate and the threaded portion of the rod works in said nut. The rod is provided at one end with a locking-head 18, which has an inclined face 20, adapted to engage an inclined bearing 21 on one of the members of the slotted plate. The other end of the rod is provided with an operating-handle 22, which projects forward and rearward from the rod, the rearward projection being adapted to engage a pin 23, which extends laterally from the plate, and when thus engaged the head 18 will be held in position to pass through the slot 17 when the parts of the mold are moved toward each other. An upward turn of the handle 22 will cause the inclined surfaces 20 and 21 to engage with each other in such manner as to cause the two parts of the mold to move closer together, and at the same time the rod 19 will by virtue of its threaded connection move longitudinally and thereby aid in drawing the two parts closer together. As the action of the inclined surfaces and of the thread will be simultaneous, the two parts of the mold will be very quickly closed together and securely locked. Preferably the bearing-surfaces 20 and 21 will be of hardened steel. A lock similar to this is used with the several sections of the press-mold and will not be further referred to, the same parts being indicated by the same reference-numerals in all the locks. Each mold-section is also provided with similar plates 16 and with a handle 62.

The bottom of each part 13 of the blow-mold is recessed, as indicated at 25, to receive the seat 12, and preferably the recesses and the edge of the seat will be formed to make a dovetail joint, as shown, in order to prevent vertical movement between the parts. In some cases, however, it may be advisable to have these engaging surfaces perpendicular. Each part 13 is provided with a recess 26 at its upper end similar to the recess 25, for a purpose to be hereinafter referred to. Each part 13 is also provided at its upper end with a laterally-projecting lug 27, which lugs serve as supports for the press-mold when open.

Immediately above the blow-mold is the press-mold, and it will be made up of two or more superposed sections separable on a horizontal plane. As shown in the drawings, there are three such sections, and each section is composed of two vertically-divided parts hinged together. The lower section 28 is provided with a pocket or cavity 29, closed at the bottom and of such size as to contain approximately the quantity of glass to be used in forming the article to be molded. Each part of this section has one or more rearwardly-extending arms 30, which project beyond the hinge of the blow-mold and fit over a tapered pin 31, which is removably supported in an opening 33 in a short vertical standard 32, fixed in the table 1. The lower one of the series of arms 30 rests upon the top of the standard 32. The pocket 29 may of course be of any desired shape. The section 34 immediately above the section 28 is in this particular case designed to give the general outline to the neck of a bottle, it being provided with a cavity 35, which is open at both ends and communicates at its lower end with the pocket 29. The parts of this section are also provided with rearwardly-extending arms 36, which are also fitted over the tapered pin 31 to turn thereon.

The top section 37 is that in which the extreme upper end of the article is formed, shown in this particular case to be the finish of a long narrow-necked bottle; but in any case some laterally-extending part at the upper end of the article will be formed in it—as, for instance, a lip on a chimney, lantern-globe, or bottle, or the threads on a fruit-jar, &c. The opening for this purpose is indicated at 38, and, as shown clearly in Fig. 8, the opening is wider at its upper than at its lower end. Immediately above the opening 38 is the enlarged recess 39, which receives a plug 40, movable with the plunger 8, but through which the plunger may have independent movement. The lower end of the plug may be shaped, as required, to give the desired finish to the article. Each part of the section 37 is hinged upon a tapered sleeve 41 in the same vertical plane as the tapered sleeve 14, upon which the parts of the blow-mold are hinged. A rod 42 passes loosely down through the sleeves 41 and 14, being held in place by a pin 43. An opening 14ᵃ in the table 1 registers with the opening in the sleeve 14 in order that the rod 42 may be free to move downward through the sleeve 14 when necessary. An angular bar 44 is slidably supported at its upper end in the arm 6 and is free to move vertically, but not to turn in its support. The lower end of this bar is connected to the rod 42 immediately below the section 37 and is bent, as shown, to form a support for said section, the bar 44 and rod 42 being designed to support and guide the section 37 in its downward movement to the blow-mold and its return therefrom. Some means must be provided to control or regulate the speed of the descent of the section 37 and also automatically to return it, and for this purpose a weight 45 may be used, such weight being connected with the bar 44 by a chain or rope 46, which runs over a pulley 47, supported on the arm 6. This weight will be such that it will overcome the weight of the section 37 alone and not sufficient to overcome the weight of the section and a blank supported thereby; but it will act to regulate the speed of descent of the section and blank, and when the blank, or rather the finished article, has been released from the section the weight will automatically return the section 37 to its normal position. Any suitable stop may be provided to limit the upward movement of the section 37—such as a pin 48 in the bar 44, adapted to contact with the arm 6.

A centering-rod 49 is secured in the bottom plate 11 of the blow-mold and extends vertically, and each part of each mold is provided with a groove 50, adapted to fit over said rod when the molds are closed. This brings all the molds or sections of a mold in proper vertical alinement and the rod 49 also serves as an additional guide for the section 37 in its vertical movements.

The section 34 is provided with a recess 51 in its upper and lower faces similar to the recess 26 in the blow-mold, and the sections 28 and 37 are provided, respectively, with projections 52 and 53 to fit into said recesses.

Each section 28 and 34 is preferably provided with laterally-projecting lugs (indicated by 54 and 55, respectively) similar to the lugs on the blow-mold, and said lugs 54 and 55 serve as supports for the sections immediately above them when open.

In order to relieve the weight of the apparatus from the balls 3 and also to form an additional support for the vertical standard 4, a bar 56 is secured to the truck-frame in any suitable manner and extends below the table 1 and standard 4. A screw 57 works in the bar 56 and has a tapered or rounded end 58, which fits in a recess in the bottom of the standard. The screw 57 can be adjusted, as is apparent, to thereby relieve the weight on the balls to any desired extent. It will also prevent the table from sagging in the center. This feature is illustrated in detail in Fig. 9.

Any suitable blowing mechanism may be employed, and preferably it will be supported adjacent to the molding apparatus in such manner that the molds will be successively brought into position to be connected therewith. In the drawings the blowing mechanism is indicated by 65, and 66 indicates a foot-treadle, by means of which the nozzle of the blower is lowered and held in position in the mold during the operation of blowing. Another treadle-foot is indicated by 67, and operates a locking-pin 68, which holds the table 1 against turning movement on the wheeled frame.

The operation of the apparatus is as follows, it being understood that the sets of molds are used successively: The blow-mold will be open, the lower section 28 of the press-mold closed, and in the apparatus illustrated in the drawings the sections 34 and 37 will be opened in order that the glass may be placed directly into the pocket 29, the openings in the other sections being too small for the expeditious insertion of the glass. The desired quantity of glass having been placed in the pocket 29, the sections 34 and 37 will be closed and the plunger lowered into the press-mold. This necessarily results in forcing some of the glass up into the sections 34 and 37, thereby forming the neck and finish of the bottle. The plunger is then withdrawn and the sections 34 and 28 opened. The blank will then be suspended from the section 37 and the combined weight of the two will overcome that of the weight 45, and the blank and section will drop by gravity down to the blow-mold, passing between the opened parts of sections 34 and 28. The blank will pass into the blow-mold and the section 37 will be supported upon the blow-mold. The blow-mold will be closed around the blank and the table moved sufficiently to bring the molds containing the blank to the blowing apparatus, where the blank will be expanded to its finished form by blowing. As soon as the section 37 is opened the bottle will be released from it and the weight will automatically return it to its position above the section 34.

In making many articles of glassware the section 34 of the press-mold will be entirely dispensed with, but the mode of operation will be substantially the same as that heretofore described. When the section 37 is supported upon the blow-mold and the latter is closed, the projection 53 on the section 37 will fit in the recess 26 in the blow-mold.

I do not intend to limit my invention to the precise details of construction shown in the drawings, as they may be modified in many particulars without departing from the spirit or changing the scope of my invention.

Having described the invention, I claim—

1. In a machine for making hollow glassware, a rotary table and groups of mechanisms thereon, each group being independent of every other group and including pressing devices and a blow-mold so related to each other that the article may be transferred from one to the other.

2. In a machine for making hollow glassware, a rotary table and groups of mechanisms thereon, each group being independent of every other group and including a press and a blow mold, said press-mold being above the blow-mold and constructed to permit the article to be transferred from it to the blow-mold, means for effecting such transference, and a plunger mechanism.

3. In a machine for making hollow glassware, a rotary table, and groups of mechanisms secured thereon, each group being independent of every other group and including a press-mold, a plunger mechanism, means for actuating the plunger mechanism, a blow-mold, and means for transferring the blanks from the press-mold to the blow-mold.

4. In a machine for making hollow glassware, a rotary table, a press-mold, a blow-mold, means for transferring the blank from the press-mold to the blow-mold, a support therefor, said molds and support being rigidly secured to the said table.

5. In an apparatus for the manufacture of glassware, the combination with a blow-mold, of a press-mold supported thereon, said press-mold consisting of a plurality of superposed sections, the lower section or sections being movable laterally out of the path of the upper sections to permit the latter to move to and from the blow-mold.

6. In an apparatus for the manufacture of glassware, the combination with a blow-mold, of a press-mold supported thereon, said press-mold consisting of a series of superposed sections, each section consisting of two vertically-divided parts, means to separate and support the parts of the lower section or sections, and means to move the upper section vertically to and from the blow-mold between the separated parts.

7. In an apparatus for the manufacture of glassware, the combination with a blow-mold, of a press-mold supported thereon, said press-mold consisting of a series of superposed sections, and means to support the upper section yieldingly when the other sections are moved from beneath it, substantially as set forth.

8. In an apparatus for the manufacture of glassware, the combination with a blow-mold, of a press-mold supported thereon, said press-mold consisting of a series of superposed sections, each section consisting of two vertically-divided parts hinged together, means to separate and support the parts of the lower section, and a counterbalancing means connected to the upper section, and permitting said section and a blank carried thereby to descend between the separated parts to the blow-mold, and automatically returning the upper section when the blank is released therefrom, substantially as set forth.

9. A blow-mold, a sectional press-mold supported thereon, a counterbalancing-weight connected to the upper section of the press-mold and supporting it yieldingly when the other sections of the press-mold are removed from beneath it, and means to guide said other section to and from the blow-mold, substantially as set forth.

10. In an apparatus for manufacturing glassware, the combination with a blow-mold, a press-mold supported upon the blow-mold, and movable laterally thereon, a plunger and actuating means supported above the press-mold, and a blowing mechanism, substantially as described.

11. In an apparatus for manufacturing glassware, a rotatable table, a blow-mold supported thereon, a press-mold supported upon the blow-mold and movable laterally thereon, a plunger and actuating means supported from the table above the press-mold, and movable with the table and molds, and a blowing mechanism, substantially as set forth.

12. The combination with a blow-mold, of a press-mold formed of a plurality of superposed sections of which one section is movable out of the path of another and the latter is movable toward and from the blow-mold, and a guide-pin for said latter section.

13. In an apparatus for manufacturing glassware, a blow-mold formed of two vertically-divided and separable parts hinged together, and a press-mold supported upon the blow-mold, said press-mold being in horizontally-separable sections, each section formed of two vertically-divided parts hinged together, the hinges of the blow-mold and of the upper section of the press-mold having a common vertical axis and the vertical axis of the hinge of the intermediate section being remote therefrom, substantially as and for the purpose set forth.

14. The combination with superposed molds, each mold formed of two vertically-divided parts hinged together, of lugs projecting laterally from the molds to support the parts of the mold immediately above when in their open position, substantially as set forth.

15. The combination with a table, of a bottom plate 11 secured thereto, a sleeve supported in said plate, a two-part blow-mold hinged upon the sleeve, a press-mold above the blow-mold, said press-mold formed of superposed sections each consisting of two vertically-divided parts, a sleeve upon which the parts of the upper section are hinged, a rod extending through the upper sleeve into the lower one, and a movable support for the upper section connected to the rod, substantially as described.

16. The combination with a table, of a blow-mold supported thereon, said mold being vertically divided and the two parts hinged together, a press-mold supported upon the blow-mold and formed of superposed sections each consisting of vertically-divided parts, the parts of the upper section being hinged together on an axis in the same vertical plane as that of the hinge of the blow-mold, a hollow standard 32 secured to the table to the rear of the hinge of the blow-mold, and a pin 31 removably supported in the said standard and upon which the sections of the press-mold below the upper one are hinged, substantially as set forth.

17. In an apparatus for making glassware, the combination with a rotary table, a plurality of press-molds supported thereby to move therewith, and a separate plunger for each of said molds, said plungers and molds being carried simultaneously by the table around such axis that each plunger is at all times alined with the particular mold in which it operates, of a series of blow-molds so related to the respective press-molds that the pressed blanks may conveniently be transferred thereto from the press-mold which coöperates with it in the formation of the article, and a blowing mechanism into operative relation with which the blow-molds are successively brought by the rotation of said table.

18. In an apparatus for making glassware, the combination of a rotary table, a plurality of blow-molds supported thereby to move therewith, a press-mold supported on each of said blow-molds, each press-mold consisting of a plurality of superposed sections of which the lower one is movable out of the path of the upper to permit the latter to move to and from the blow-mold, a separate plunger for each of said press-molds, said plungers and molds being carried simultaneously by the table around such axis that each plunger is at all times alined with the particular mold in which it operates, and a blowing mechanism into operative relation with which the blow-molds are successively brought by the rotation of said table.

19. The combination with a blow-mold, of a press-mold formed of a plurality of superposed and vertically-divided parts hinged together, the lower of said parts being movable out of the path of the upper and said upper part movable toward and from the blow-mold, said parts having grooves, and a centering-pin over which the grooves fit when the mold is closed.

20. The combination with a blow-mold, of a press-mold superposed thereon and composed of a plurality of superposed sections each of which comprises a plurality of parts hinged together in relative positions which permits the lower one to move entirely from between the upper section and the blow-mold, and said upper section and the blow-mold having a relative movement toward and from one another.

21. The combination with a blow-mold, formed of a plurality of sections hinged together, of a press-mold superposed on said blow-mold and formed of a plurality of superposed sections, each of said sections being composed of a plurality of parts hinged together and the hinge of one section being in a different vertical plane from the hinge of another section, said blow-mold and the upper section of the press-mold having a relative movement toward and from one another.

22. The combination with a blow-mold, formed of a plurality of sections hinged together, of a press-mold above said blow-mold, formed of a plurality of sections, said blow-mold and an upper section of said press-mold being relatively movable toward and from one another; each of said press-mold sections being composed of a plurality of parts hinged together and the hinges of said sections being so related as to enable the lower section of the press-mold to open entirely free from the blow-mold to permit said relative movement, and a guide-pin engaging said molds when the same are closed.

In testimony whereof I affix my signature in presence of two witnesses.

MATTHEW H. HART.

Witnesses:
JOHN BALES,
JAMES N. SLOUGH.